United States Patent
Li et al.

(10) Patent No.: US 9,531,811 B2
(45) Date of Patent: Dec. 27, 2016

(54) METHOD FOR SHARING APPLICATION

(71) Applicant: ArcSoft Hangzhou Co., Ltd., Hangzhou, Zhejiang Province (CN)

(72) Inventors: Sheng Li, Hangzhou (CN); Nan Liu, Hangzhou (CN)

(73) Assignee: ArcSoft Hangzhou Co., Ltd., Hangzhou, Zhejiang Province (CN)

( * ) Notice: Subject to any disclaimer, the term of this patent is extended or adjusted under 35 U.S.C. 154(b) by 155 days.

(21) Appl. No.: 14/197,225

(22) Filed: Mar. 5, 2014

(65) Prior Publication Data

US 2015/0256595 A1  Sep. 10, 2015

(51) Int. Cl.
| | |
|---|---|
| *G06F 15/16* | (2006.01) |
| *H04L 29/08* | (2006.01) |
| *H04W 4/08* | (2009.01) |
| *H04W 4/20* | (2009.01) |
| *H04L 29/06* | (2006.01) |

(52) U.S. Cl.
CPC ............ *H04L 67/141* (2013.01); *H04L 67/08* (2013.01); *H04L 67/14* (2013.01); *H04L 67/16* (2013.01); *H04L 67/34* (2013.01); *H04L 67/38* (2013.01); *H04W 4/08* (2013.01); *H04W 4/206* (2013.01)

(58) Field of Classification Search
None
See application file for complete search history.

(56) References Cited

U.S. PATENT DOCUMENTS

| | | | |
|---|---|---|---|
| 8,843,616 B2 * | 9/2014 | Ochoa | 709/203 |
| 2003/0156591 A1 * | 8/2003 | Sorsa | H04L 67/42 370/401 |
| 2006/0215576 A1 * | 9/2006 | Yu | H04W 48/18 370/252 |

* cited by examiner

*Primary Examiner* — Azizul Choudhury
(74) *Attorney, Agent, or Firm* — Winston Hsu; Scott Margo

(57) ABSTRACT

For sharing an application between mobile devices, an application share program is installed on mobile devices. The application share program is able to establish a link between at least one host mobile device and at least one client mobile device. A host mobile device shares a share session. An application of the share session is shared and installed on to the at least one client mobile device. And the application is uninstalled from the at least one client mobile device when the share session is terminated.

10 Claims, 10 Drawing Sheets

METHOD FOR SHARING APPLICATION

BACKGROUND OF THE INVENTION

1. Field of the Invention

The present invention relates to a method of sharing application for portable mobile devices, and more particularly, a method of sharing an application between a host mobile device and at least one client mobile device.

2. Description of the Prior Art

There are a growing number of users of portable mobile devices that may include mobile phones and tablets. Therefore a market for mobile applications is growing as well. A growing number of applications are being developed that may be of personal use or for business applications. Though the memories of mobile devices are considerably small compared to notebooks and personal computers and memory expansions are not available. Therefore users need to choose to install applications that may be used more frequently than others. This means that the mobile device is not able to install applications that may be preferred by the user but less frequently used than other applications. And in some cases may cause inconvenience to the user when circumstance for the need for a specific application that is not installed in the mobile device arises.

SUMMARY OF THE INVENTION

An embodiment of a method for sharing application is disclosed. The method for sharing application comprises installing and running an application share program on at least one host mobile device and at least one client mobile device, establishing a link between the at least one host mobile device and the at least one client mobile device, a host mobile device of the at least one host mobile device providing a share session to the at least one client mobile device to share an application of the share session, and terminating the share session.

These and other objectives of the present invention will no doubt become obvious to those of ordinary skill in the art after reading the following detailed description of the preferred embodiment that is illustrated in the various figures and drawings.

DETAILED DESCRIPTION

For enhancing memory use for portable devices and convenience for accessing applications, the present invention discloses a method for sharing an application. The mobile device used in the embodiments of the present invention may be a smart pad or a smart phone.

An application share program is installed on a mobile device. The mobile device can serve as a host mobile device or a client mobile device depending on the function selected. The mobile device can run the application share program in foreground of the mobile device when a user interface of the application share program is opened. And the application share program will keep on running in the background of the mobile device after the user interface of the application share program has been closed. The running of the application share program in the background allows client mobile devices to discover share sessions of the mobile device running the application share program acting as a host mobile device. And allow monitoring of status of the host mobile device and at least one client mobile device when a share session is in progress.

To establish a link between the host mobile device and the at least one client mobile device, a wireless network is utilized.

Figure 1:
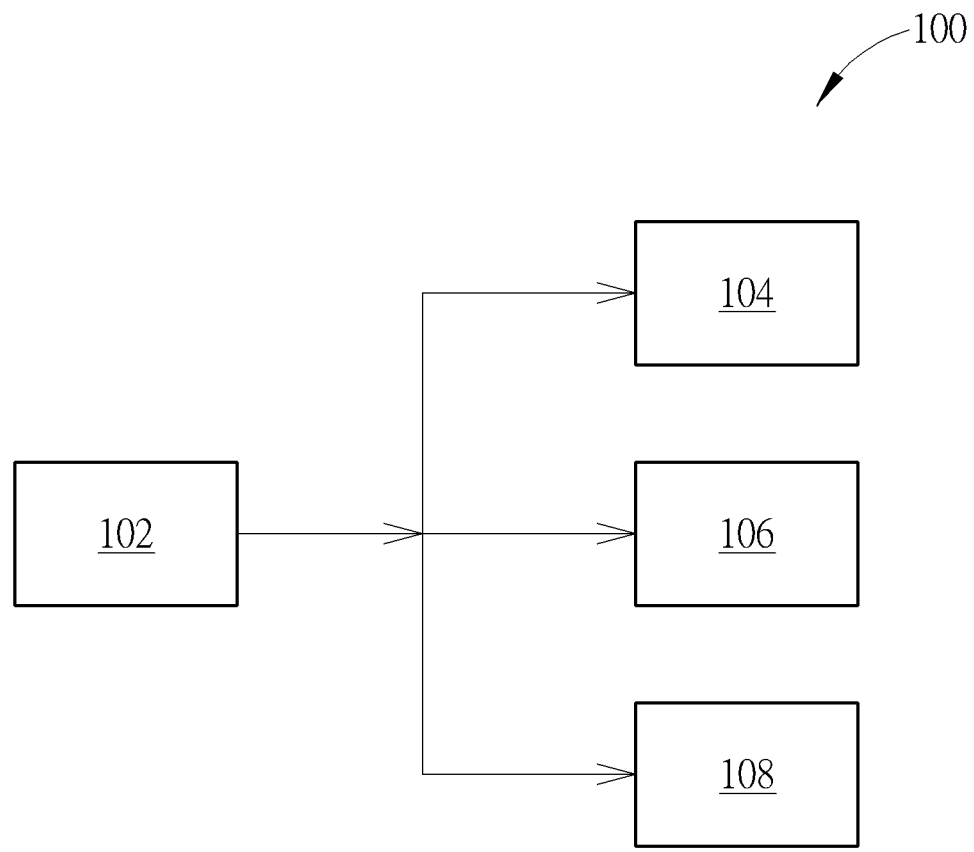
FIG. 1 illustrates an advertising diagram of the present invention.

Please refer to FIG. 1. FIG. 1 illustrates an advertising diagram 100 of the present invention. The advertising diagram 100 includes a first host mobile device 102 and a plurality of client mobile devices 104, 106 and 108. The host mobile device 102 can create at least one share session and make a list of information about each of the at least one share session available to the plurality of client mobile devices 104, 106 and 108 for discovery. The list of information may include but not limited to name of an application corresponding to a share session, the memory size of the application and date which the share session was created.

Figure 2:
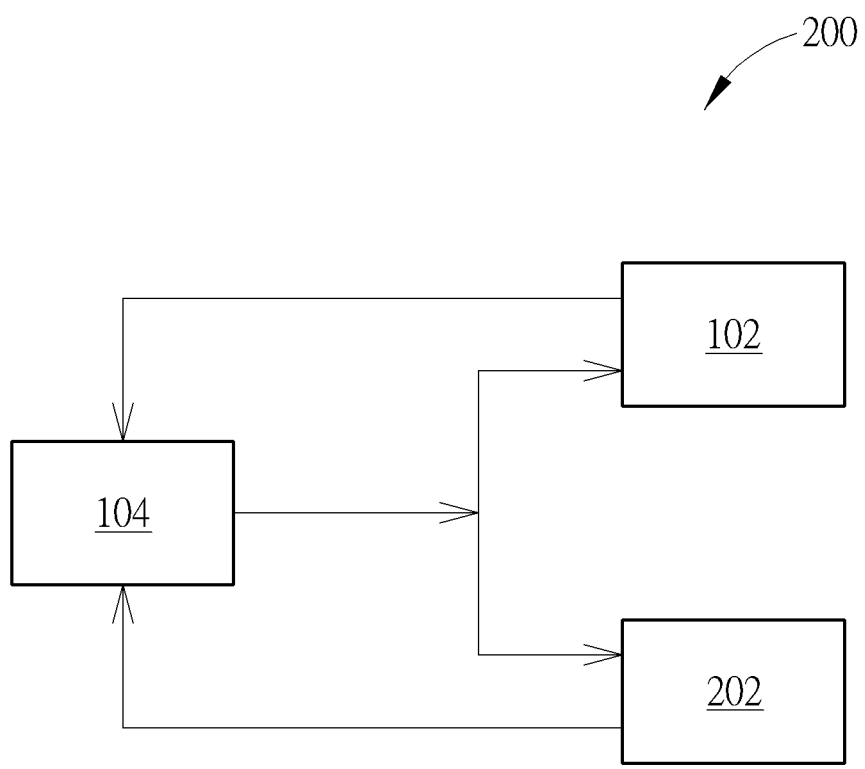
FIG. 2 illustrates a search diagram of the present invention.

Please refer to FIG. 2. FIG. 2 illustrates a search diagram 200 of the present invention. The search diagram 200 includes a first client mobile device 104 and a plurality of host mobile devices 102 and 202. The first client mobile device 104 is able to search share sessions that have been made available by the plurality of host mobile devices 102 and 202. The first client mobile device 104 sends out a search request. The plurality of host mobile devices 102 and 202 receives and responds to the search request by sending the first client mobile device 104 a list of available share sessions created by the plurality of host mobile devices 102 and 202.

To establish a share session between the first host mobile device 102 and the first client mobile device 104, the first host mobile device 102 creates at least one share session and makes the at least one share session available for search to the first client mobile device 104.

When the first client mobile device 104 sends a search request to the first host mobile device 102, the first host mobile device 102 responds to the search request by sending a list of the at least one share session available to the first client mobile device 104. From the list of the at least one share session, a share session is selected by the first client mobile device 104. The first client mobile device 104 then sends a session join request corresponding to the share session selected to the first host mobile device 102. The first host mobile device 102 then receives the session join request and responds by sending a session permission command to establish the share session. And an installing package of an application corresponding to the share session selected is sent to the first client mobile device 104. The first client mobile device 104 then install the application using the installing package received from the first host mobile device 102 through the share session. After the first client mobile device 104 has finished installing the application, the first client mobile device 104 and the first host mobile device 102 can then simultaneously access the application. A second client mobile device 106 may also establish the share session with the first host mobile device 102 at the same time with the first client mobile device 104 by performing the same actions as that of the first client mobile device 104.

After the share session is established between the first host mobile device 102 and the first client mobile device 104, the second client mobile device 106 may also join the share session after the share session has been started. The second client mobile device 106 sends a search request to the first host mobile device 102. The first host mobile device 102 shall respond to the search request by sending the list of the at least one share session including the share session that has been established between the first host mobile device 102 and the first client mobile device 104 to the second client mobile device 106. The second client mobile device 106 shall send a session join request corresponding to the share session to the first host mobile device 102. A session permission command is sent to the second client mobile device 106 by the first host mobile device 102 in response to the session join request to establish the share session between the first host mobile device 102, the first client mobile device 104 and the second client mobile device 106. And the installing package of the application corresponding to the share session is sent to the second client mobile device 106. The second client mobile device 106 uses the installing package received from the first host mobile device 102 to install the application. The first client mobile device 104, the second client mobile device 106 and the first host mobile device 102 can then simultaneously access the application.

A host mobile device may host a share session for a plurality of client mobile devices. And the plurality of client mobile devices may be able to establish the share session with the host mobile device simultaneously. Each of the plurality of client mobile devices may also join the share session according to the time a session join request is sent and accepted by the host mobile device.

If a third client mobile device 108 is within a perimeter covered by the wireless network used in the share session, the third client mobile device 108 may also be able to receive the list of the at least one share session of the first host mobile device 102 after sending a search request. The third client mobile device 108 may send a session join request to the first host mobile device 102. If the first host mobile device 102 chooses to send a session reject command to the third client mobile device 108, the third client mobile device 108 will not be able to join the share session.

To terminate the share session between the first host mobile device 102 and the first client mobile device 104, either the first host mobile device 102 can send a session quit request to the first client mobile device 104 or the first client mobile device 104 can send the session quit request to the first host mobile device 102. The share session is then terminated and the application can be uninstalled from the first client mobile device 104.

Figure 3:
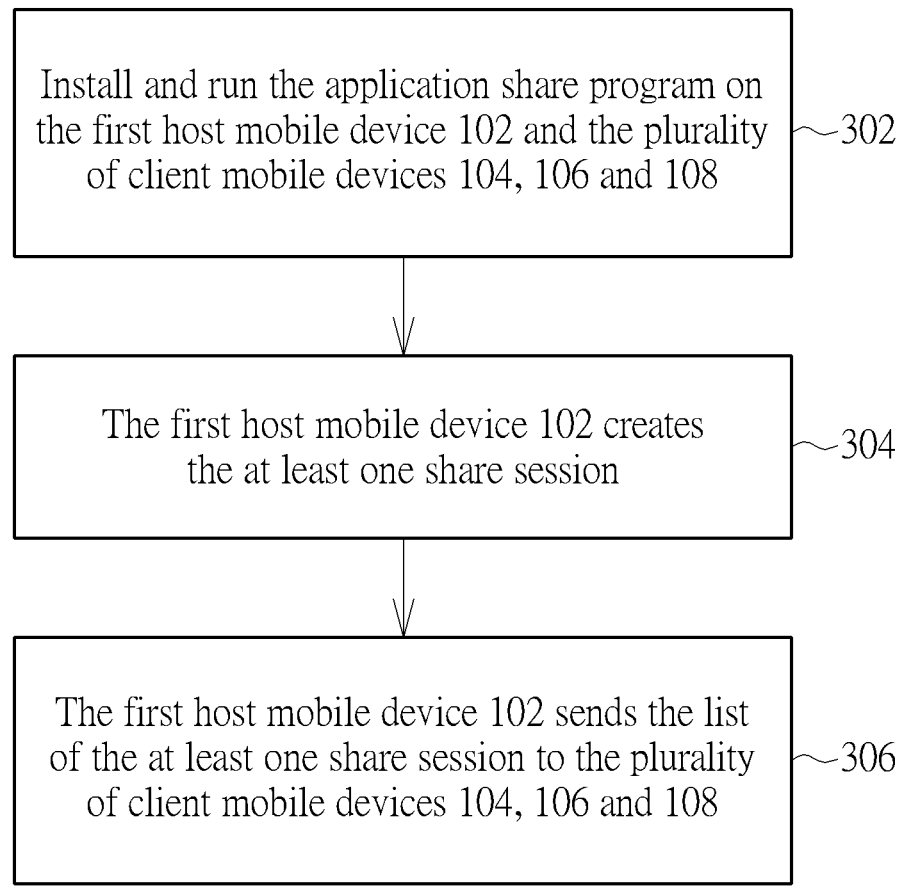
FIG. 3 illustrates a flowchart of a first embodiment of the method of sharing application according to FIG. 1.

Please refer to FIG. 3. FIG. 3 illustrates a flowchart of a first embodiment of the method of sharing application according to FIG. 1. The method comprises not limited to the following steps:

Step 302: Install and run the application share program on the first host mobile device 102 and the plurality of client mobile devices 104, 106 and 108;

Step 304: The first host mobile device 102 creates the at least one share session;

Step 306: The first host mobile device 102 sends the list of the at least one share session to the plurality of client mobile devices 104, 106 and 108.

Figure 4:
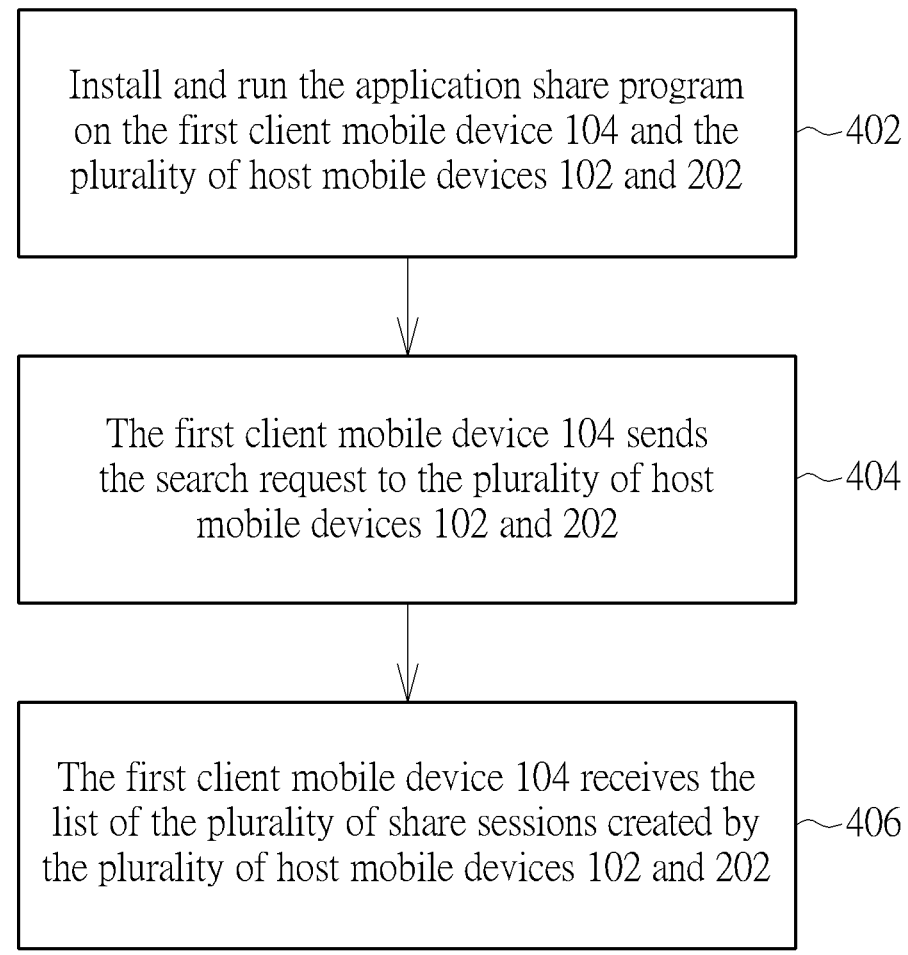
FIG. 4 illustrates a flowchart of a second embodiment of the method of sharing application according to FIG. 2.

Please refer to FIG. 4. FIG. 4 illustrates a flowchart of a second embodiment of the method of sharing application according to FIG. 2. The method comprises not limited to the following steps:

Step 402: Install and run the application share program on the first client mobile device 104 and the plurality of host mobile devices 102 and 202;

Step 404: The first client mobile device 104 sends the search request to the plurality of host mobile devices 102 and 202;

Step 406: The first client mobile device 104 receives the list of the plurality of share sessions created by the plurality of host mobile devices 102 and 202.

Figure 5:
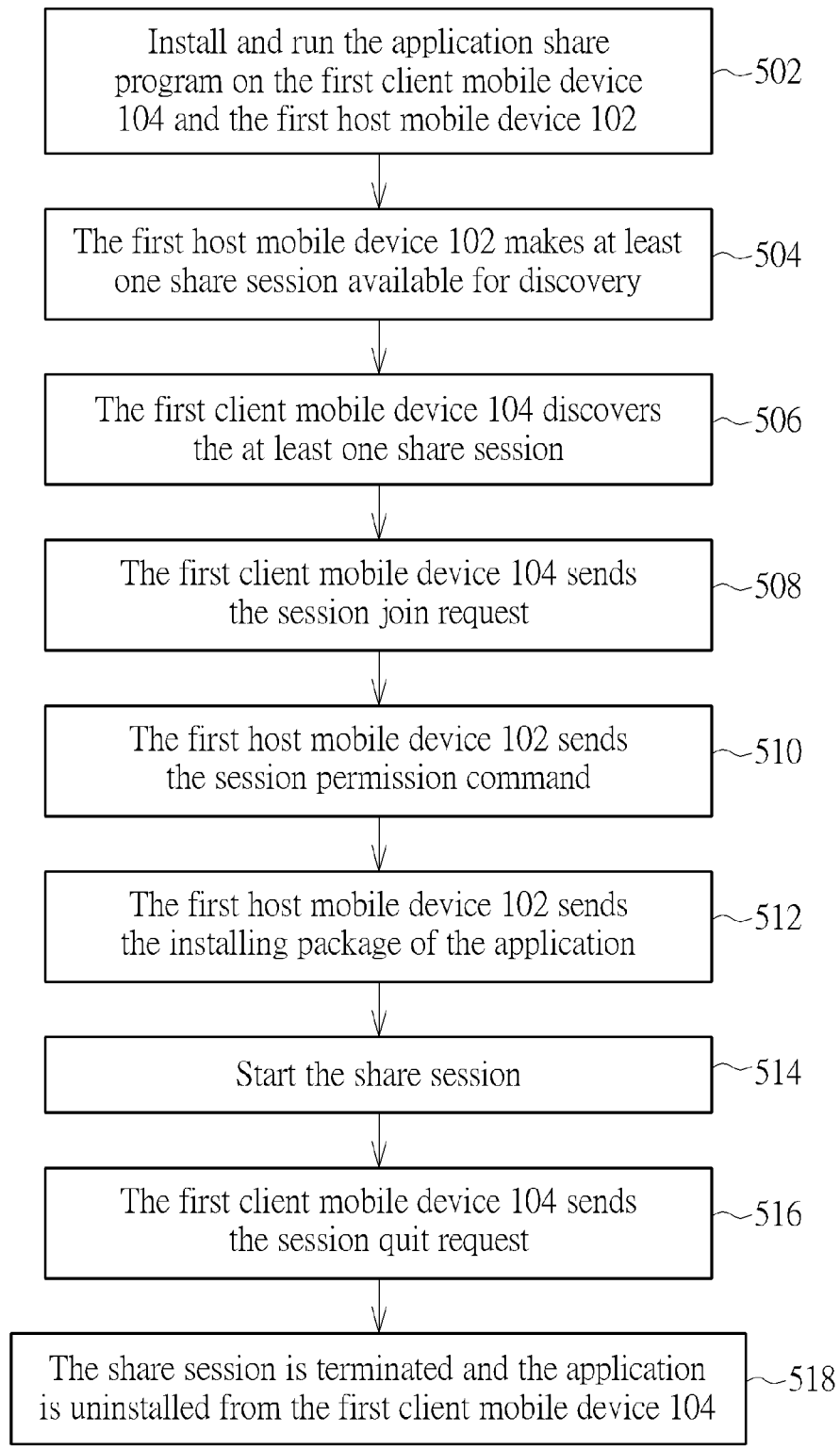
FIG. 5 illustrates a flowchart of a third embodiment of the method of sharing application according to the present invention.

Please refer to FIG. 5. FIG. 5 illustrates a flowchart of a third embodiment of the method of sharing application. The method comprises not limited to the following steps:

Step 502: Install and run the application share program on the first client mobile device 104 and the first host mobile device 102;

Step 504: The first host mobile device 102 makes at least one share session available for discovery;

Step 506: The first client mobile device 104 discovers the at least one share session;

Step 508: The first client mobile device 104 sends the session join request to the first host mobile device 102 to ask for permission to join the share session from the at least one share session;

Step 510: The first host mobile device 102 sends the session permission command to the first client mobile device 104;

Step 512: The first host mobile device 102 sends the installing package of the application to the first client mobile device 104;

Step 514: Start the share session by installing and running the application on the first client mobile device 104;

Step 516: The first client mobile device 104 sends the session quit request to the host mobile device 102;

Step 518: The share session is terminated and the application is uninstalled from the first client mobile device 104.

The second client mobile device 106 may join the share session between the first client mobile device 104 and the first host mobile device 102, step 506 to step 518 may be repeated having the second client mobile device 106 in place of the first client mobile device 104. In step 516, the first host mobile device 102 may send the session quit request to at least one client mobile device that has joined the session share. Instance of termination between the first host mobile device 102 and each of the at least one client mobile device may be different from each other depending on the time the session quit request has been sent. Note that the session quit request may be sent by the host mobile device and/or one of the client mobile devices.

Figure 6:
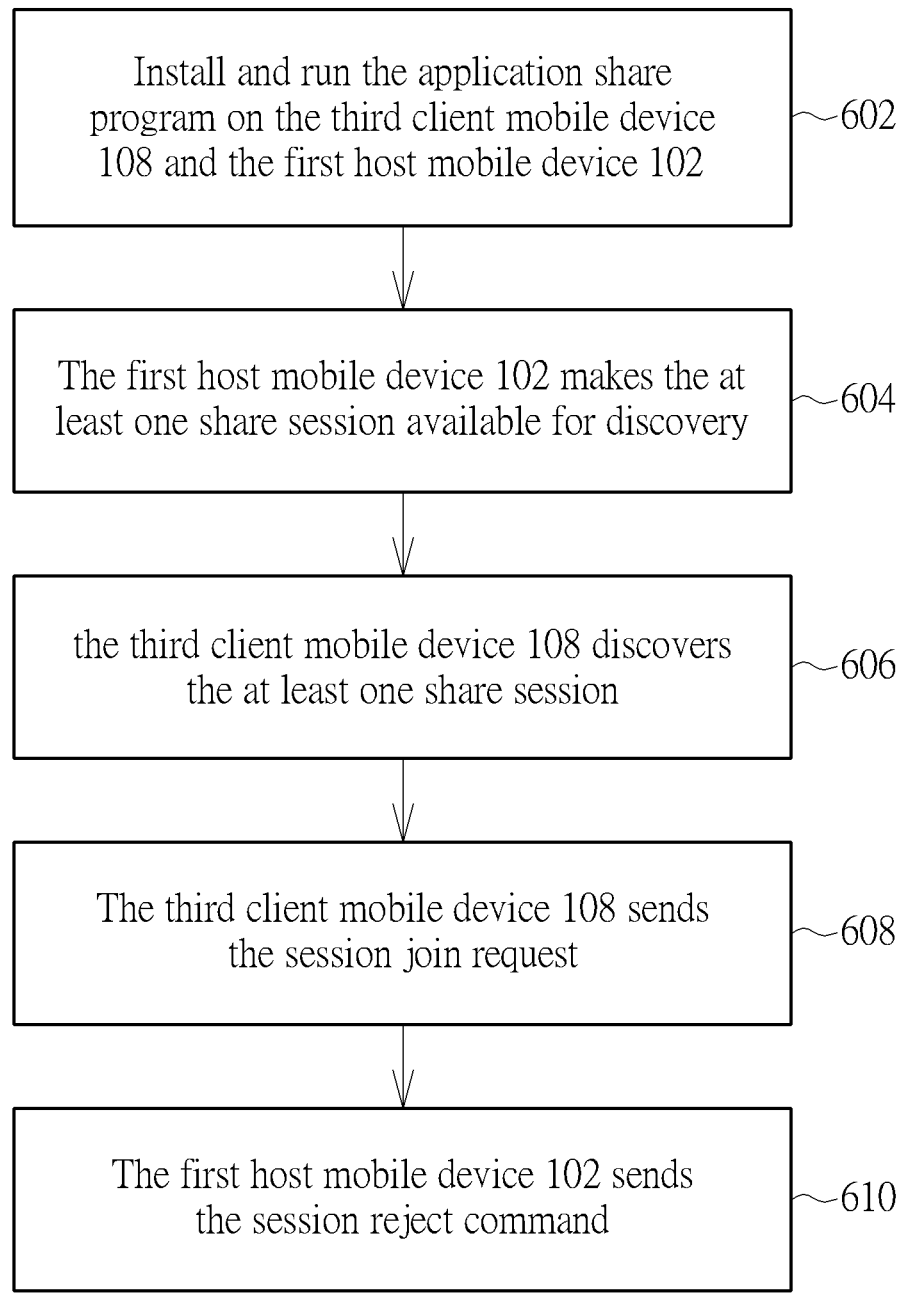
FIG. 6 illustrates a flowchart of a fourth embodiment of the method of sharing application according to the present invention.

Please refer to FIG. 6. FIG. 6 illustrates a flowchart of a fourth embodiment of the method of sharing application. The method comprises not limited to the following steps:

Step 602: Install and run the application share program on the third client mobile device 108 and the first host mobile device 102;

Step 604: The first host mobile device 102 makes the at least one share session available for discovery;

Step 606: the third client mobile device 108 discovers the at least one share session;

Step 608: The third client mobile device 108 sends the session join request to the host mobile device to ask the first host mobile device 102 for permission to join the share session;

Step 610: The first host mobile device 102 sends the session reject command to the third client mobile device 108.

The method of sharing application disclosed in the present invention may be used for different purposes. For personal applications, a plurality of users may be able to share applications including games, multimedia tools, or organizing tools. The plurality of users is able to play a game application as long as a user from the plurality of users has the game application installed on a mobile device of the user. The mobile device of the user will then act as a host mobile device for a share session of the game application. The mobile device of other users shall act as a client mobile device. The game application shall install on to the client mobile device during the share session and may be uninstalled from the client mobile device when the share session has been terminated.

For business application, a restaurant may provide an application in place of a menu to the customers and taking orders from the customers. The restaurant may provide a host mobile device that would create a share session for at least one customer having a mobile device. The mobile device of the at least one customer shall be a client mobile device for the share session. The share session may be terminated anytime the application is no longer needed. The application may be automatically uninstalled from the client mobile device when the share session has been terminated.

For another business application, a business may advertise an application by doing a demonstration of an application supplied by the business using a share session from a host mobile device provided by the business. The share session for the application shall be made available to consumers through the use of a mobile device of each of the consumers, the mobile device serving as a client mobile device. The application may be uninstalled from the client mobile device after the share session has been terminated.

The above mentioned scenarios are only examples to illustrate aspects of the present invention for clarity, and not intended to limit the scope of the invention.

The method of sharing application disclosed allows a mobile device to act either as a host mobile device or a client mobile device. At least one client mobile device can search and select from at least one share session from at least one host mobile device. Each share session corresponds to an application. The at least one client mobile device sends a session join request to the host mobile device. The host mobile device can either accept or reject the session permission request. If the session join request is accepted by the host mobile device, a session permission command and an installing package are sent to the at least one client mobile device. The application is then installed on the at least one client mobile device and can then be used by the host mobile device and the at least one client device at the same time. If the session permission request is rejected by the host mobile device, the share session is then terminated.

To terminate a share session of an application, a host mobile device or a client mobile device may send a session quit request respectively to the client mobile device or the host mobile device. After the share session is terminated, the application may then be uninstalled from the client mobile device.

Since mobile devices are designed to be portable, therefore mobile devices are not designed to have large memory capacity. The uninstalling of the application will allow the client mobile device to be able to use applications on circumstances that the application is needed. Limited memory of the mobile device is then not wasted on installation of seldom used or specific use applications.

Figure 7:
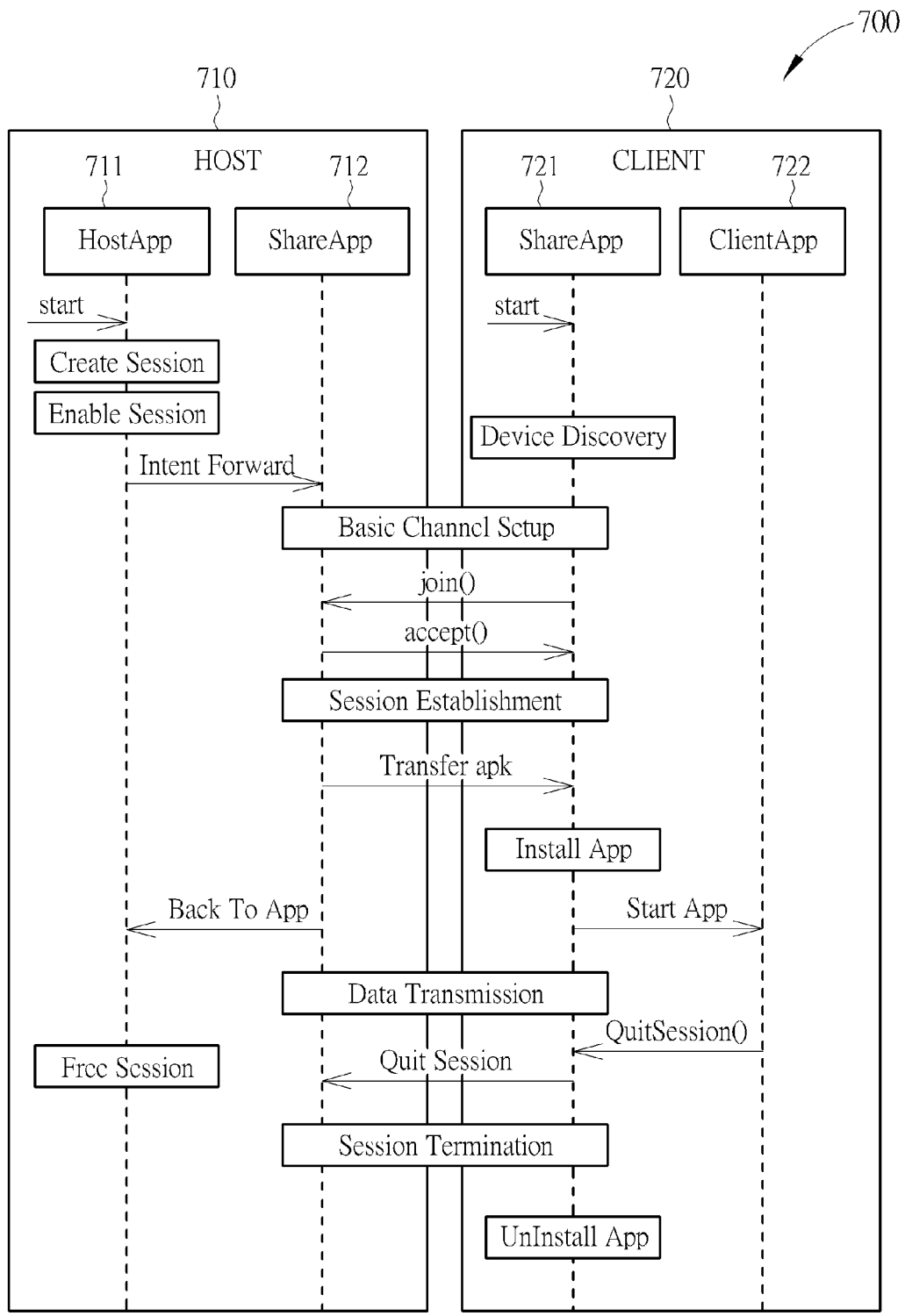
FIG. 7 illustrates an exchange of commands between and within the host mobile device and the client mobile device.

Please refer to FIG. 7 to further understand the communication between a host mobile device and a client mobile device. FIG. 7 illustrates an exchange of commands between and within the host mobile device 710 and the client mobile device 720. The host mobile device 710 comprises a host application 711 and a sharing application 712. The client mobile device 720 comprises a client application 722 and a sharing application 721. The sharing applications 712 and 721 are the same application installed in both the host mobile device 710 and the client mobile device 720 to facilitate the communication between the two devices. The host application 711 and the sharing application 721 may be launched. The host application 711 may then create and enable a share session. The share session is then forwarded to the sharing application 712. While the host application 711 is generating a share session, the sharing application 721 sends a command to discover available share session from the host mobile device 710. A basic channel setup between the host mobile device 710 and the client mobile device 720 is established. The sharing application 721 sends a join command to the sharing application 712 and the sharing application 712 may then send an accept command to the sharing application 721. The share session is then established between the host mobile device 710 and the client mobile device 720. The sharing application 712 shall then send an installation package of the host application 711 to the sharing application 721. The sharing application 721 may then initiate the installation of the client application 722 which is a copy of the host application 711. The host mobile device 710 shall start the host application 711 and the client mobile device 720 shall start the client application 722. Data transmission between the host mobile device 710 and the client mobile device 720 is done during the share session. The client application 722 may send a quit command to the sharing application 721 to instruct the termination of the share session. The share application 721 shall send a quit command to the share application 712. The host application 711 shall also stop and get free from the share session. A session termination shall be established between the sharing application 712 and the sharing application 712. And the share application 721 shall uninstall the client application 722 from the client mobile device 720.

Figure 8:
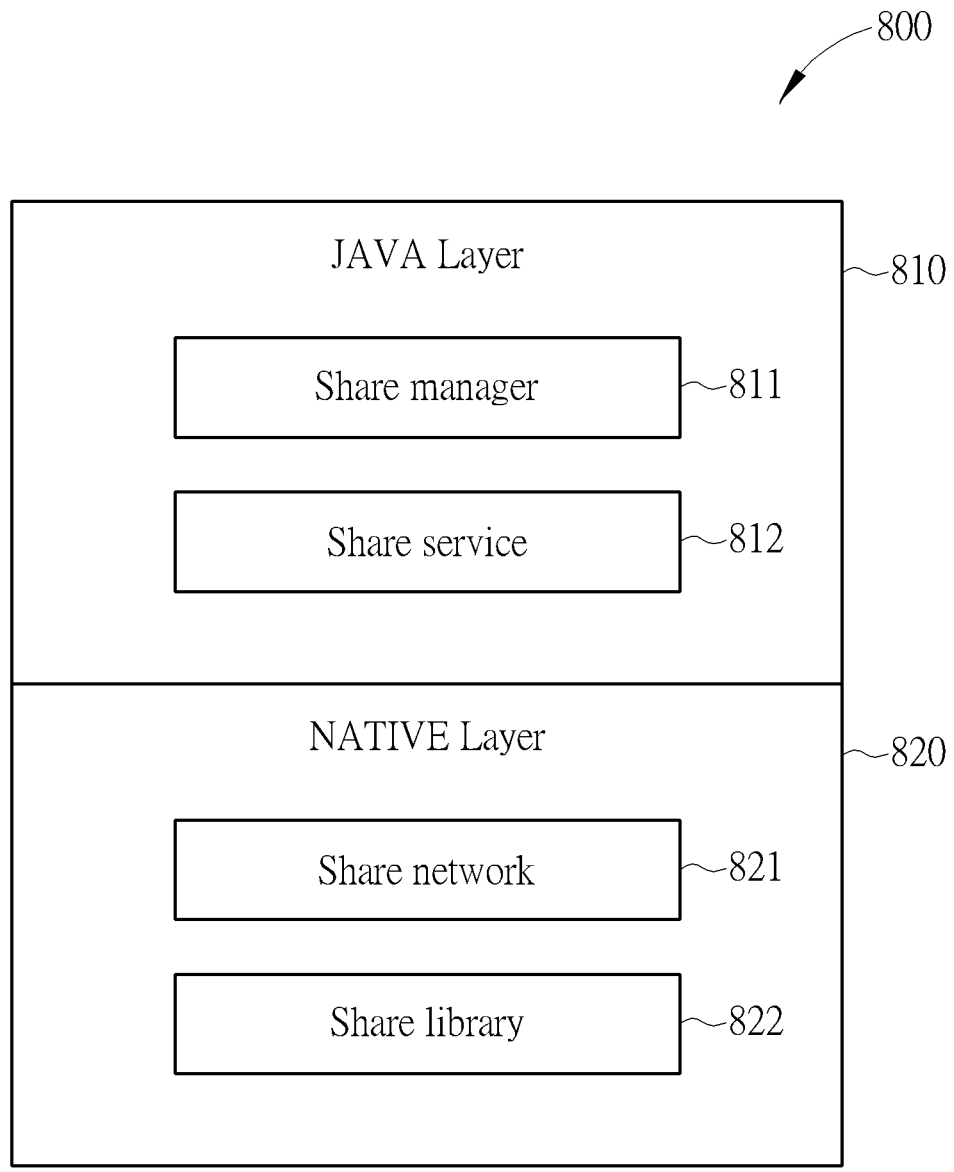
FIG. 8 illustrates architecture of a share application.

Please refer to FIG. 8. FIG. 8 illustrates architecture of a share application 800. The share application 800 comprises a java layer 810 and a native layer 820. The java layer 810 comprises a share manager 811 and a share service 812. The native layer comprises a share network 821 and a share library 822. The share manager 811 provides a discovery interface for a client mobile device to search for a host mobile device and a paring interface to accept join request from other client mobile devices. The share service 812 runs in the background of the share application. The share service 812 is used for discovery and monitoring of status, and an inter process access for third party application based on the software development kit of the share application. The share network 821 is the java native interface use for accessing share library. The share library 822 is native libraries for providing basic function to the share network.

Figure 9:
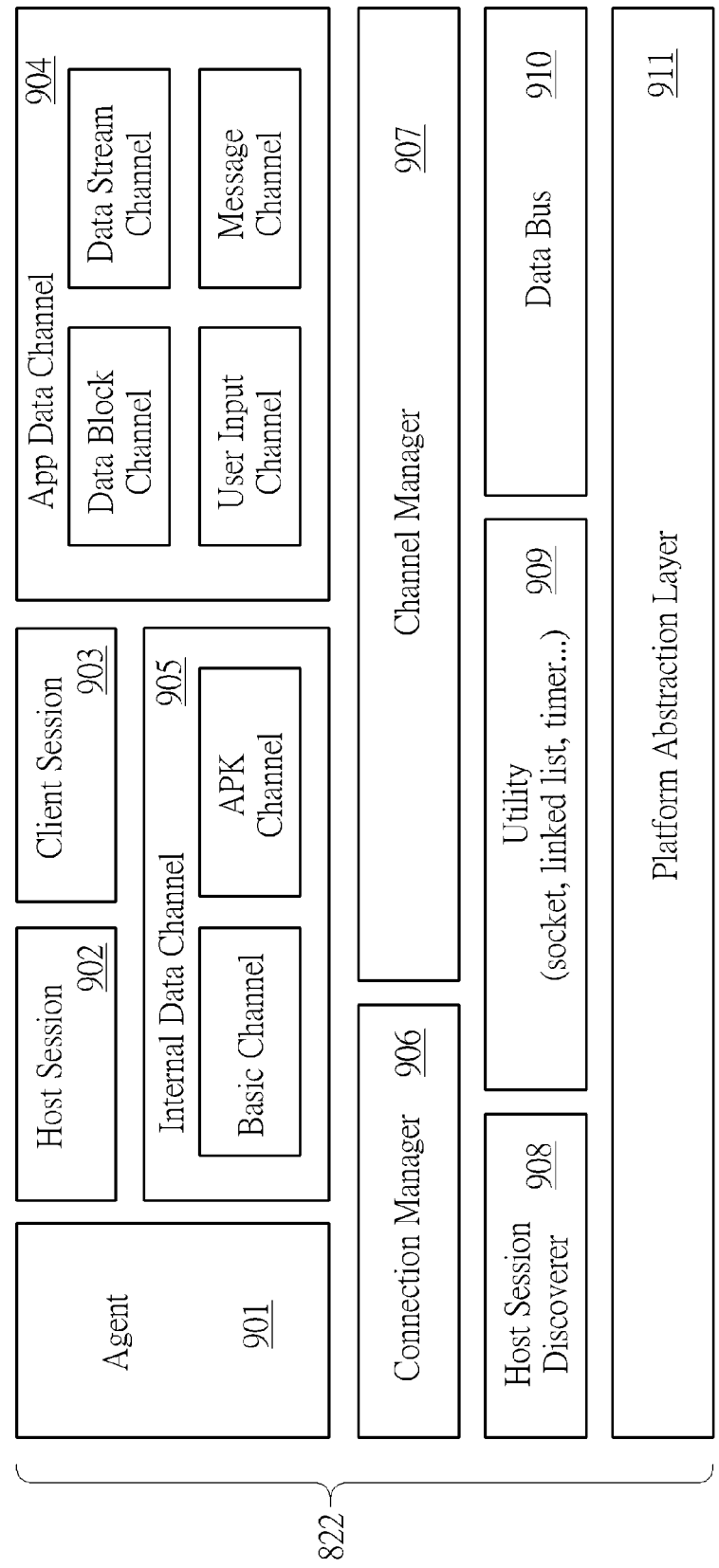
FIG. 9 illustrates architecture of the share library.

Please refer to FIG. 9. FIG. 9 illustrates architecture of the share library 822. The share library 822 comprises an agent 901 that manages the lifecycle and provides application programming interface of the share application, a host session 902 that is created when a host application is to be shared on a share session, a client session 903 that is created when a client mobile device is to join a share session, an app data channel 904 that provides several channel that is used for communication between applications during a share session, an internal data channel 905 that provides channels for communication between a host mobile device and a client mobile device, a connection manager 906 that manages the connection between agents of the share application, a channel manager 907 that manages the channels, a host session discoverer 908 that discovers available share sessions, a utility 909 that provide utilities to the share application such as scheduler, timer, socket, etc., a data bus 910 that generates data bus among agents of the share application, and platform abstraction layer 911 that provides application programming interface to abstract the platform to port agents to multiple platform.

Figure 10:
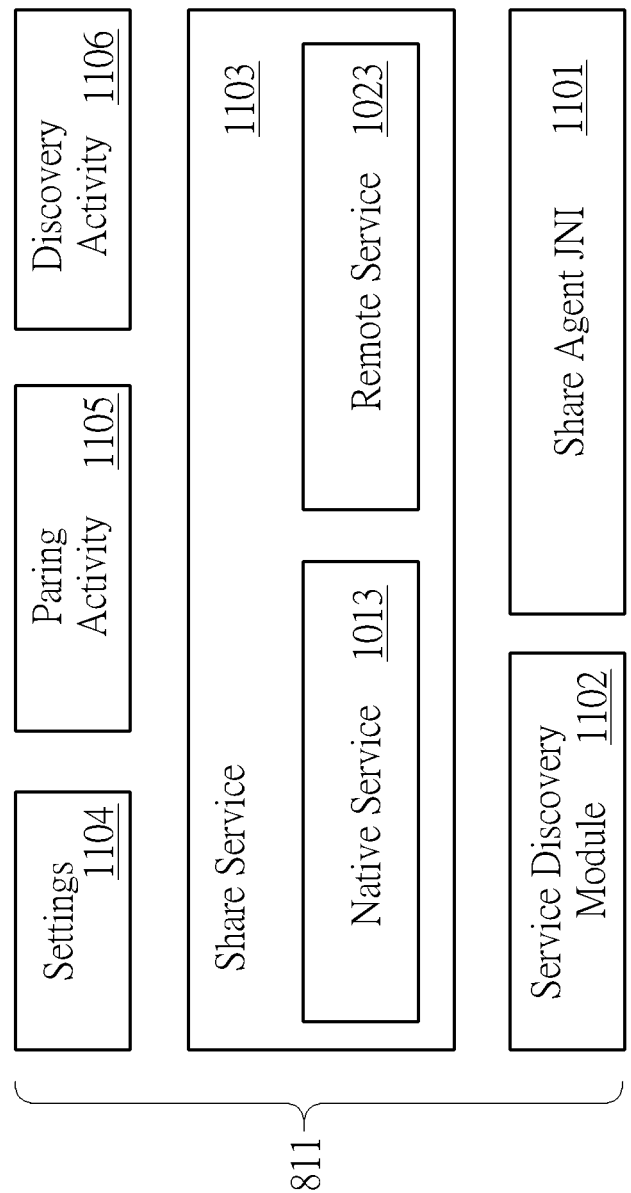
FIG. 10 illustrates architecture of the share manager.

Please refer to FIG. 10. FIG. 10 illustrates architecture of the share manager 811. The share manager 811 comprises a share agent java network interface (JNI) 1001 to access the share library of the share application, a service discovery module 1002 that provides a service discovery using Wi-Fi Direct, a share service 1003 that starts when the system boots and keeps running in the background and comprises of a native service 1013 and a remote service 1023, a settings 1004 used for application configuration management, a paring activity 1005 sets up a network connection between mobile devices during share session, and a discovery activity 1006 that pertains to the interface of the share application when launched and client mobile devices can see a list of available sessions within the network. The native service 1013 manages the device discovery and monitors the status of the share session. The remote service 1023 provides the function of sharing to a third-party using Blinders.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for sharing application, comprising:
    installing and running an application share program on a plurality of mobile devices to facilitate communication between the plurality of mobile devices;
    establishing a link between a host mobile device of the plurality of mobile devices and a first client mobile device of the plurality of mobile devices;
    the host mobile device making at least one share session available for discovery;
    a first client mobile device of the plurality of mobile devices discovering the at least one share session;
    the first client mobile device sending a session join request to the host mobile device to ask the host mobile device for permission to join a selected share session of the at least one share session; and
    in response to the first client mobile device sending a session join request to the host mobile device to ask the host mobile device for permission to join the selected share session, the host mobile device providing a share session to the first client mobile device through wireless communication between the application share program of the host mobile device and the application share program of the first client mobile device to share an application of the selected share session to the client mobile device;
    the first client mobile device installing the application shared by the host mobile device; and
    uninstalling the application from first client mobile device after terminating the share session;
    wherein any of the plurality of mobile devices can act as the host mobile device or the first client mobile device.

2. The method of claim 1, further comprising:
    the host mobile device sending a session permission command to the first client mobile device before the application is installed on the first client mobile device.

3. The method of claim 2, further comprising:
    the host mobile device sending an installing package of the application to the first client mobile device.

4. The method of claim 3, wherein the application is installed on the first client mobile device through the installing package by the first client mobile device.

5. The method of claim 1, wherein the first client mobile device discovers the share session when the host mobile device is running the application share program in a foreground of the host mobile device.

6. The method of claim 1, wherein the first client mobile device discovers the share session when the host mobile device is running the application share program in a background of the host mobile device.

7. The method of claim 1, further comprising:
    a second client mobile device of the plurality of mobile devices discovering the at least one share session;
    the second client mobile device sending a session join request to the host mobile device to ask the host mobile device for a permission to join the share session; and
    the host mobile device sending a session reject command to the second client mobile device.

8. The method of claim 1, wherein the link is established by utilizing a wireless network.

9. The method of claim 1, wherein terminating the share session comprises:
    the first client mobile device sends a session quit request to the host mobile device; and
    uninstalling the application from the first client mobile device.

10. The method of claim 1, wherein terminating the share session comprises:
    the host mobile device sends a session quit request to the first client mobile device; and
    uninstalling the application from the first client mobile device.

* * * * *